United States Patent
Groschup et al.

(10) Patent No.: US 10,491,062 B2
(45) Date of Patent: Nov. 26, 2019

(54) ELECTRIC MACHINE ROTOR

(71) Applicant: Ford Global Technologies, LLC, Dearborn, MI (US)

(72) Inventors: Benedikt Groschup, Bavaria (DE); Franco Leonardi, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 537 days.

(21) Appl. No.: 15/064,645

(22) Filed: Mar. 9, 2016

(65) Prior Publication Data

US 2017/0264153 A1    Sep. 14, 2017

(51) Int. Cl.
   *H02K 1/27*    (2006.01)
   *H02K 7/00*    (2006.01)
   *H02K 1/28*    (2006.01)

(52) U.S. Cl.
   CPC ......... *H02K 1/2753* (2013.01); *H02K 1/2766* (2013.01); *H02K 1/28* (2013.01); *H02K 7/003* (2013.01)

(58) Field of Classification Search
   CPC .... H02K 7/003; H02K 1/2753; H02K 1/2766; H02K 1/28
   USPC ...... 310/156.1, 156.9, 156.13, 61, 60 A, 65; 464/104, 143, 183, 185
   See application file for complete search history.

(56) References Cited

U.S. PATENT DOCUMENTS

| | | | | |
|---|---|---|---|---|
| 4,585,967 A | * | 4/1986 | Mayer ................. | H02K 1/28 29/598 |
| 4,822,330 A | * | 4/1989 | Penhasi ................ | B04B 9/08 494/16 |
| 4,987,330 A | * | 1/1991 | Murphy ................. | H02K 1/28 310/211 |
| 6,707,206 B2 | * | 3/2004 | Chang .................. | H02K 1/278 310/156.01 |
| 6,891,297 B2 | | 5/2005 | Shimada et al. | |
| 6,940,199 B2 | | 9/2005 | Imamura et al. | |
| 7,436,096 B2 | | 10/2008 | Guven et al. | |
| 7,763,336 B2 | * | 7/2010 | Clarke ................... | C08G 18/10 428/35.7 |
| 7,902,711 B2 | | 3/2011 | Blissenbach et al. | |
| 7,948,133 B2 | * | 5/2011 | Fu ........................ | H02K 1/28 310/156.09 |
| 8,729,767 B2 | | 5/2014 | Feurrohr et al. | |

(Continued)

OTHER PUBLICATIONS

Office Action issued in U.S. Appl. No. 15/064,643, dated May 9, 2018, 9 pages.

*Primary Examiner* — Forrest M Phillips
(74) *Attorney, Agent, or Firm* — David B. Kelley; Brooks Kushman P.C.

(57) ABSTRACT

A rotor may include a planar lamination having permanent magnets arranged therein, and an inner edge defining an opening configured to receive a driveshaft. The planar lamination may include a driveshaft key, and a relief notch and scallop disposed on each side of the driveshaft key. The relief notch and scallop may distribute stress imparted to the driveshaft key and reduce deformation due to centrifugal loads during rotation of the rotor. The relief notches may be next to the driveshaft key. The relief notches may be sandwiched between the scallops. The inner edge may include additional scallops.

22 Claims, 3 Drawing Sheets

(56) References Cited

U.S. PATENT DOCUMENTS

| | | | |
|---|---|---|---|
| 8,896,176 B2* | 11/2014 | Ryu | H02K 1/276 |
| | | | 310/156.09 |
| 8,957,560 B2 | 2/2015 | Uchiyama et al. | |
| 9,035,522 B2 | 5/2015 | Liang et al. | |
| 9,385,567 B2 | 7/2016 | Nagahiro et al. | |
| 2012/0074805 A1 | 3/2012 | Takizawa | |
| 2012/0093447 A1* | 4/2012 | Hibi | F16C 17/02 |
| | | | 384/100 |
| 2012/0248915 A1 | 10/2012 | Kagami et al. | |
| 2013/0043761 A1* | 2/2013 | Kaimori | F16D 1/0876 |
| | | | 310/216.123 |
| 2013/0234557 A1* | 9/2013 | Kobayashi | H02K 1/28 |
| | | | 310/216.123 |
| 2014/0210293 A1 | 7/2014 | Kagami et al. | |
| 2014/0361656 A1 | 12/2014 | Legranger et al. | |
| 2015/0236555 A1 | 8/2015 | Takeda et al. | |
| 2016/0105059 A1 | 4/2016 | El Baraka et al. | |

\* cited by examiner

ELECTRIC MACHINE ROTOR

TECHNICAL FIELD

The present disclosure relates to a permanent magnet electric machine rotor.

BACKGROUND

Hybrid and electric vehicles use an electric machine to provide motive force. Hybrid vehicles may use internal combustion engines and electric machines to propel the vehicle. Electric machines may also be used to recharge vehicle batteries.

Electric machines typically employ a rotor and a stator to produce torque. Electric current flows through windings of the stator to produce a magnetic field. The magnetic field generated by the stator may cooperate with permanent magnets affixed to the rotor to generate torque. In some arrangements, the permanent magnets may be arranged in V-shaped pairs. Moreover, torque generation may induce stresses within the rotor.

SUMMARY

A rotor may include a planar lamination having permanent magnets arranged therein, and an inner edge defining an opening configured to receive a driveshaft. The planar lamination may include a driveshaft key and a relief notch and scallop disposed on each side of the driveshaft key to distribute stress imparted to the driveshaft key and reduce deformation of the rotor due to centrifugal loads during rotation of the rotor. The relief notches may be next to the driveshaft key. The relief notches may be sandwiched between the scallops. The inner edge may further include additional scallops. The inner edge may further include another driveshaft key disposed opposite the driveshaft key. Each of the scallops may have an ovoid shape. Each of the scallops may have an elliptical shape.

An electric machine includes a stator and a rotor. The rotor may be surrounded by the stator and include an inner surface defining a driveshaft opening having a key, a pair of relief notches disposed about the key so as to sandwich the key therebetween, and a pair of scallops disposed about the relief notches so as to sandwich the relief notches therebetween such that the scallops distribute stress imparted to the key during rotation of the rotor. The inner surface may further include additional scallops. The inner surface further may include another key disposed opposite the key. Each of the scallops may an ovoid shape. Each of the scallops may have an elliptical shape.

A rotor may include a planar lamination having permanent magnets arranged therein, and an edge defining a driveshaft key, a pair of relief notches straddling the driveshaft key, and a pair of scallops straddling the relief notches to distribute stress imparted to the driveshaft key during rotation of the rotor. The edge may further define additional scallops. The edge may further define another driveshaft key disposed opposite the driveshaft key. Each of the scallops may have an ovoid shape. Each of the scallops may have an elliptical shape.

An electric machine may include a rotor having permanent magnets arranged therein, and a surface defining a driveshaft slot, and a pair of scallops straddling and spaced from the driveshaft slot to distribute stress imparted to the driveshaft slot during rotation of the rotor. The surface may further define additional scallops. The surface may further define another driveshaft slot disposed opposite the driveshaft slot. Each of the scallops may have an ovoid shape. Each of the scallops may have an elliptical shape.

DETAILED DESCRIPTION

Figures 1A, 1B:
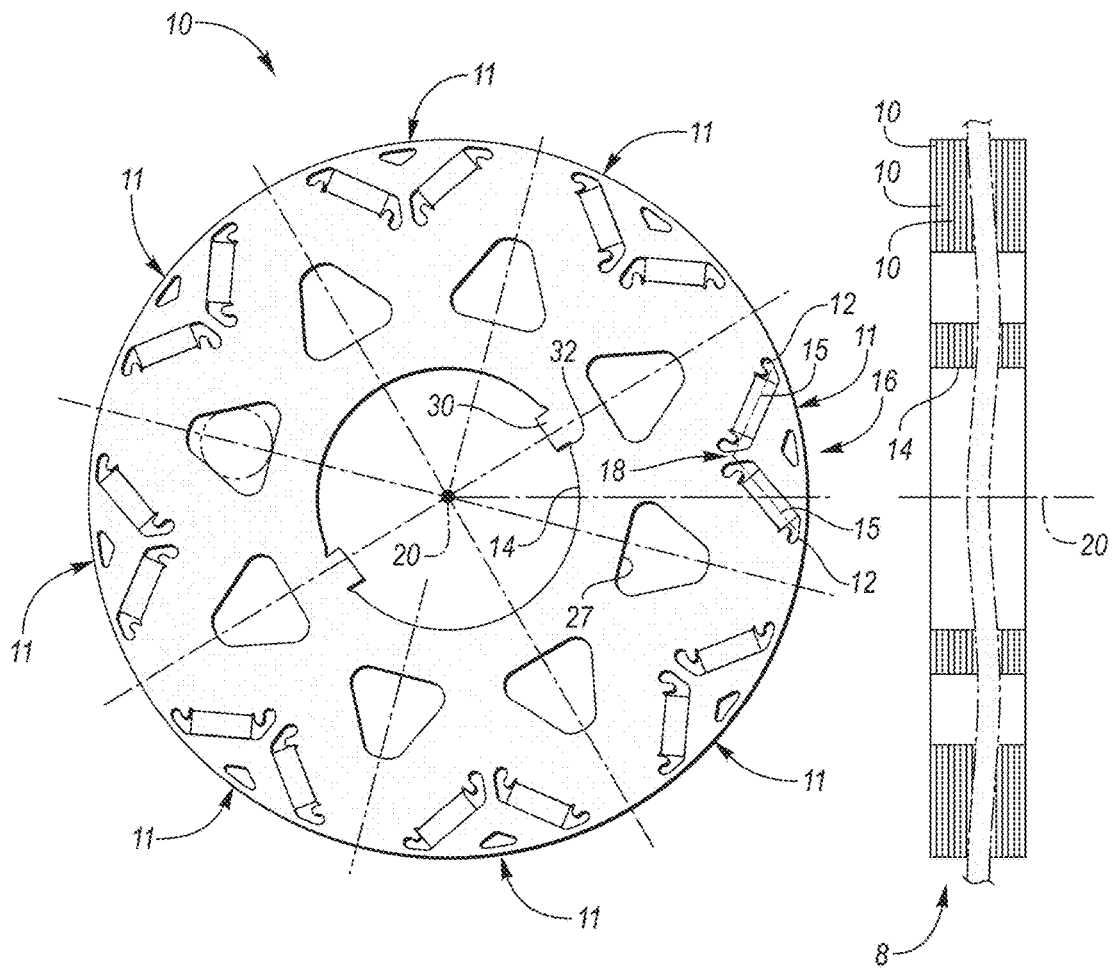
FIG. 1A is a plan view of a lamination of a rotor of an electric machine.
FIG. 1B is a side view of a rotor having stacked laminations.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric machines typically employ a rotor and a stator to produce torque. Electric current flows through windings of the stator to produce a magnetic field. The magnetic field generated by the stator may cooperate with permanent magnets affixed to the rotor to generate torque. Electric machines have many configurations. One configuration may include the rotor disposed externally, allowing the rotor to rotate about the stator. The rotor may be directly attached to drive a device. For instance, an electric machine with an external rotor may apply torques directly to fan blades or vehicle wheels. The external rotor may also supply energy to a drive chassis or shaft surrounding the rotor to collect torques produced by the rotation of the rotor.

Another configuration may dispose the rotor internally, allowing the rotor to rotate within the stator. A driveshaft may cooperate with the rotor to transfer torques generated to external devices. For instance, the driveshaft may translate torques produced by the rotor to a drivetrain of a vehicle. The transfer of torque, in both circumstances, may cause uneven or improperly distributed stresses throughout the rotor. Centrifugal loads may cause ovoid deformation of the driveshaft opening or rotor laminations. Each lamination may individually experience this uneven stress distribution or deformation. A pair of relief notches may relieve stresses near the point of energy transfer between the drive shaft and rotor. The relief notches may have many shapes. A smoothed or rounded shape may be preferred. A set of relief notches located about the energy transfer section may reduce uneven stress distributions, but those uneven distributions may be reduced further. The addition of scallops, indentations or, dimples about the drive shaft hole of the rotor may further reduce acute, high-stress areas. The scallops may be evenly or sporadically distributed about the surface, edge, or inner or outer diameter of the rotor. Each may be a curved, smooth, or rigid shape. For example, ten scallops may be evenly distributed about the inner or outer diameter of the rotor. The scallops may have similar ovoid shapes or alternating shapes (e.g., right-angled, ovoid, right-angled, ovoid).

Referring now to FIG. 1A, a planar lamination 10 for a rotor is shown. The lamination 10 may define a plurality of portions 11 for each of the alternating magnetic poles 16 formed by permanent magnets 15. The magnetic poles may be arranged such that each adjacent portion 11 is a dissimilar magnetic pole. FIG. 1A depicts an eight-pole rotor. It is well known in the art that an electric machine may have various numbers of poles. The lamination 10 may define a plurality of pockets or cavities 12 adapted to hold permanent magnets 15. The permanent magnets may form the magnetic poles 16 of the rotor. Between each of the pockets 12 a bridge may provide structural support. The center of the lamination 10 may define a circular central opening or inner edge 14 for accommodating a driveshaft with a keyway that may receive a driveshaft key 30. The permanent magnets may also be arranged in varying orientations. As shown in FIG. 1A, the pockets or cavities 12, which hold permanent magnets, are arranged with a V-shape 18. Referring now to FIG. 1B, a plurality of laminations 10 are stacked to form a rotor 8. The laminations may be skewed to improve torque output of the motor, and the laminations may be grouped into sections that are skewed relative to other sections. A central opening or hole 14 is provided axially along the rotor to engage an output shaft to transfer torque from the rotation of the rotor. A number of mass reduction cavities 27 are provided to reduce the overall mass of the rotor.

A keyed feature, drive key or driveshaft key 30 is provided on an inner surface of the center opening 14 to engage a powertrain output shaft and transfer torque from the electric machine. One or more relief notches 32 may be provided adjacent to the keyed feature 30. The shape of the cutout near the keyed feature 30 is optimized in attempt to achieve a more a uniform stress distribution at the feature. Generally, the geometry is smoothed and sharp edges are removed. While small relief notches near the keyed feature 30 limit the weakening effect on the lamination 10 and reduces oval deformation, larger relief notches have a benefit of providing a smoother stress distribution near the keyed feature 30 and a lower overall stress level.

Figure 2:
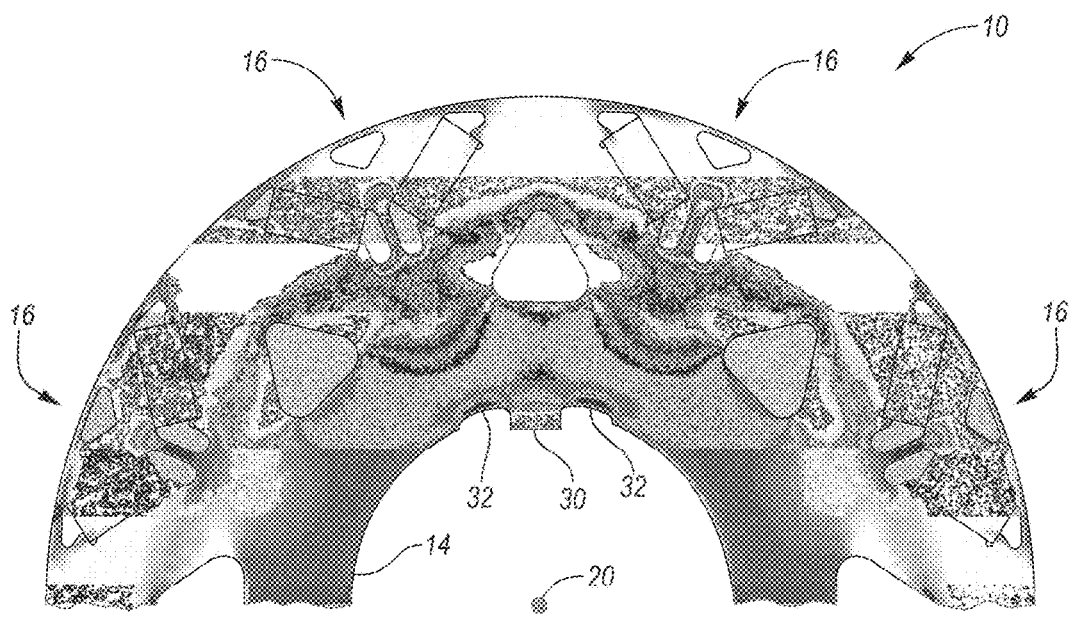
FIG. 2 is a contour plot of von Mises stress distribution of a baseline lamination layer.

FIG. 2 is a contour plot of von Mises stress for a portion of the rotor lamination layer 10 under load during operation of the electric machine. The darker regions indicate higher levels of stress. It may be advantageous to manage the stress associated with loads upon the keyed feature 30 because one of the highest stress levels in the lamination is frequently found to be near the keyed feature 30. In the example provided, the maximum stress encountered at the stress relief notches 32 is about 99% of the overall maximum stress in the lamination layer 10. As can be seen from the stress contour depicted in FIG. 2, a non-uniform stress distribution, or stress riser, is experienced adjacent the keyed feature 30. While different shapes of the relief notches 32 may be employed, redistribution of stresses caused by loads upon the keyed feature 30 may be limited using local features. While relief notches 32 improve the stress distribution of the lamination, the relief notches 32 introduces a weak point in the rotor structure that causes oval rotor deformation under centrifugal loads.

Figure 3:
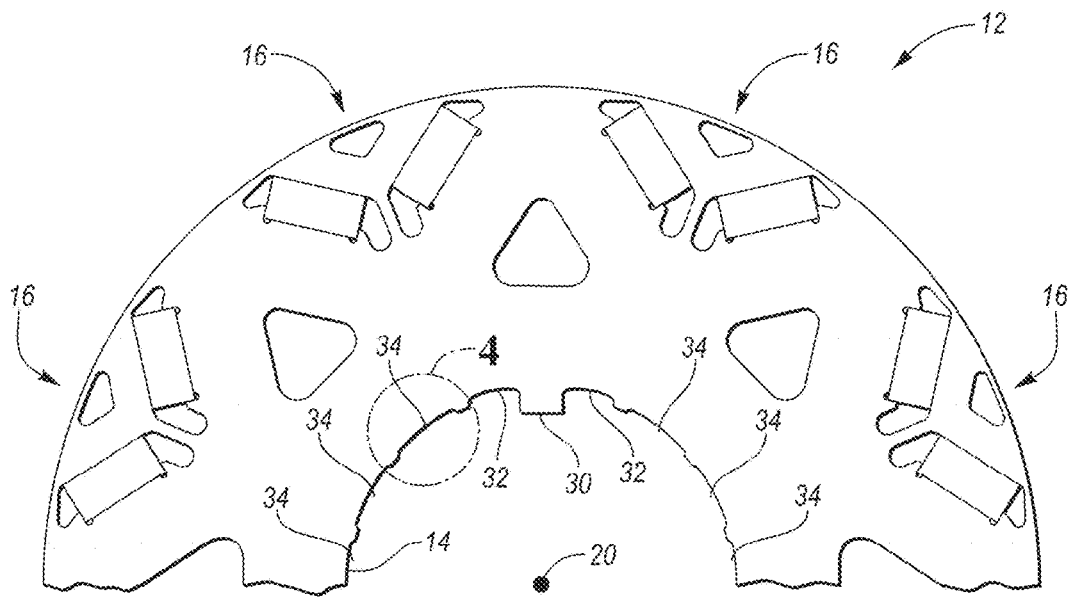
FIG. 3 is a plan view of a lamination having a set of relief notches and a plurality of scallops along the periphery of the inner diameter of the rotor.

FIG. 3 is a sectional plan view of a portion of the lamination 10. Scallops 34 may be implemented to balance oval deformation of the rotor under stress and reduce the specific stress on the relief notches 32. The relief notches 32 may sandwich the drive key or drive slot 30. A pair of scallops 34 may sandwich the relief notches 32. The scallops 34 may be evenly spaced along the periphery of the generally annular inner diameter of the lamination 10 and coincide with adjacent laminations. The scallops 34 may have a generally elliptical shape 36. The major axis 38 of the scallops 34 may be sized to fit ten scallops 34 along the periphery of the inner diameter of the central opening 14. Section A, as shown in FIG. 4, discloses a typical scallop 34.

Figure 4:
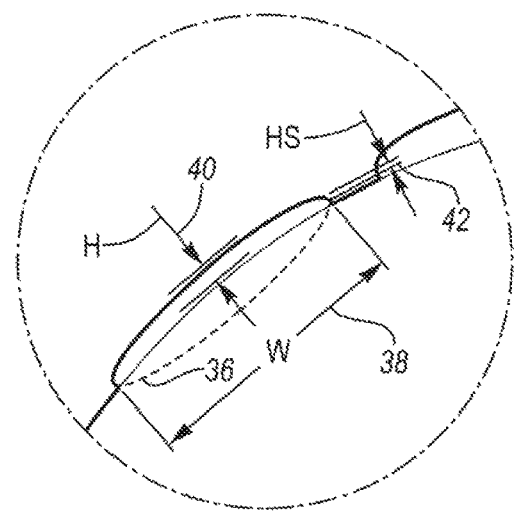
FIG. 4 is a plan view of an excerpt of a lamination layer along View A of FIG. 3.

FIG. 4 depicts an example of a scallop 34. Although a generally elliptical shape is shown, the scallop may take any shape or partial shape. For example, the scallop may be an ovoid, rectangular, or triangular shape. The smooth elliptical pattern may provide an even stress distribution under high torsional stresses and mechanical deformation. One of the preferred lengths of the major axis is 11.0 mm for an opening 14 having an inner diameter of 58 mm. One of the preferred lengths of the minor axis 40 for a similar opening is 0.72 mm. The minor axis 40 would have a cut-depth 42 from the periphery of the opening 14 of 0.30 mm.

Figure 5:
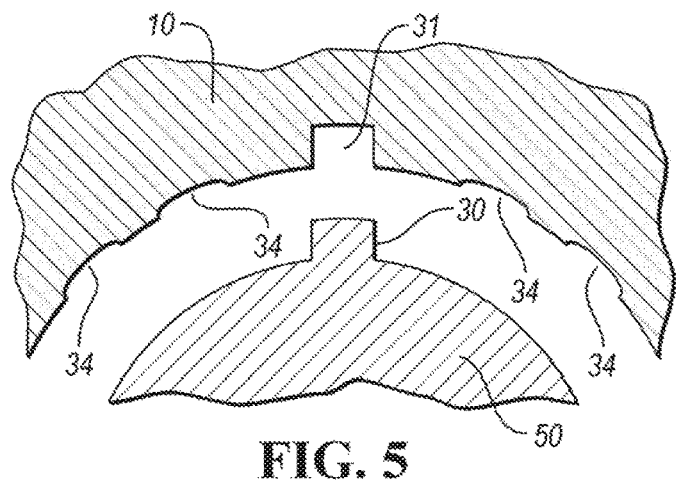
FIG. 5 a plan view of a drive shaft having a key sized to fit into a keyhole of the rotor.

Now referring to FIG. 5, in one embodiment the drive key 30 may also be disposed on the drive shaft 50 with a corresponding keyway or key slot 31 defined by the rotor lamination 10. In a similar fashion, regardless of whether the drive key is on the drive shaft or rotor, scallops 34 may be defined along the periphery of opening 14. Although the drive key 30 is preferably disposed on the inner diameter of the rotor 14, as shown in FIG. 3, it is not required. The scallops 34 may be applied to many different types of electric machines.

Figure 6:
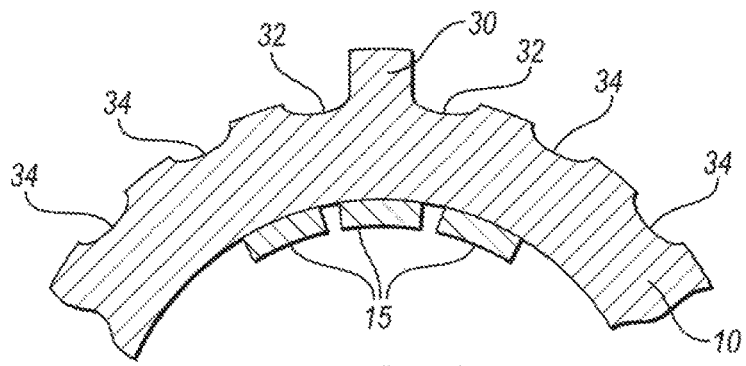
FIG. 6 is a plan view of an external rotor configured to surround an internal stator having a key sized to form to a drive ring keyhole.

Now referring to FIG. 6, an external rotor 8 is shown to indicate the versatility of the disclosure. The scallops may be located on an inner or outer surface of the rotor depending on the electric machines construction. An external rotor surrounds a stator (not shown) having coil windings. The external rotor 8 may have permanent magnets 15 positioned to form magnetic poles. The exterior rotor 8 may have a drive key 30 similar to the interior rotor 8 as discussed above. The external rotor 8 may have a set of relief notches 32 and a plurality of scallops 34 along the periphery of the outer diameter of the rotor 8.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A rotor comprising:
 a planar lamination having permanent magnets arranged therein, and an inner edge defining an opening, with a nominal diameter, configured to receive a driveshaft, the inner edge including a driveshaft key and, on each side of the driveshaft key, a relief notch and scallop separated by a portion of the opening having the nominal diameter to distribute stress imparted to the driveshaft key due to relative movements between the planar lamination and driveshaft during rotation of the rotor.

2. The rotor of claim 1, wherein the relief notches are next to the driveshaft key.

3. The rotor of claim 2, wherein the relief notches are sandwiched between the scallops.

4. The rotor of claim 1, wherein the inner edge further includes additional scallops.

5. The rotor of claim 1, wherein the inner edge further includes another driveshaft key disposed opposite the driveshaft key.

6. The rotor of claim 1, wherein each of the scallops has an ovoid shape.

7. The rotor of claim 6, wherein each of the scallops has an elliptical shape.

8. An electric machine comprising:
 a stator; and
 a rotor surrounded by the stator and including an inner surface defining a driveshaft opening with a nominal diameter, a key, a relief notch on each side of the key to sandwich the key therebetween, and a scallop on each side of the key to sandwich the relief notches therebetween such that the scallops distribute stress imparted to the key during rotation of the rotor, wherein adjacent pairs of the notches and scallops are each separated by a portion of the driveshaft opening having the nominal diameter.

9. The rotor of claim 8, wherein the inner surface further includes additional scallops.

10. The rotor of claim 8, wherein the inner surface further includes another key disposed opposite the key.

11. The rotor of claim 8, wherein each of the scallops has an ovoid shape.

12. The rotor of claim 11, wherein each of the scallops has an elliptical shape.

13. A rotor comprising:
 a planar lamination having permanent magnets arranged therein, and an edge defining a nominal diameter drive shaft opening, a driveshaft key, a pair of relief notches straddling the driveshaft key, and a pair of scallops straddling the relief notches and separated therefrom by respective portions of the nominal diameter drive shaft opening to distribute stress imparted to the driveshaft key during rotation of the rotor.

14. The rotor of claim 13, wherein the edge further defines additional scallops.

15. The rotor of claim 13, wherein the edge further defines another driveshaft key disposed opposite the driveshaft key.

16. The rotor of claim 13, wherein each of the scallops has an ovoid shape.

17. The rotor of claim 16, wherein each of the scallops has an elliptical shape.

18. An electric machine comprising:
 a rotor having permanent magnets arranged therein, and an opening with a nominal diameter configured to receive a driveshaft, the opening defining a driveshaft slot, and, on each side of the driveshaft slot, a notch and a scallop separated by a portion of the opening having the nominal diameter to distribute stress imparted to the driveshaft slot during rotation of the rotor.

19. The rotor of claim 18, wherein the surface further defines additional scallops.

20. The rotor of claim 18, wherein the surface further defines another driveshaft slot disposed opposite the driveshaft slot.

21. The rotor of claim 18, wherein each of the scallops has an ovoid shape.

22. The rotor of claim 21, wherein each of the scallops has an elliptical shape.

* * * * *